United States Patent [19]

Murata et al.

[11] Patent Number: 5,413,862
[45] Date of Patent: May 9, 1995

[54] MAGNETIC RECORDING MEDIUM HAVING A MAGNETIC LAYER COMPRISING A SPECIFIED POLYURETHANE RESIN AND MAGNETIC PARTICLES

[75] Inventors: Hiroshi Murata; Takeshi Yatsuka, both of Ohtsu, Japan

[73] Assignee: Toyo Boseki Kabushiki Kaisha, Osaka, Japan

[21] Appl. No.: 54,396

[22] Filed: Apr. 28, 1993

[30] Foreign Application Priority Data

Apr. 28, 1992 [JP] Japan .................................. 4-109841

[51] Int. Cl.⁶ ................................................. G11B 5/00
[52] U.S. Cl. .............................. 428/423.1; 428/425.9; 428/413; 428/524; 428/694 BU; 428/694 BL; 428/900
[58] Field of Search ........... 428/423.1, 425.9, 694 BU, 428/694 BL, 900, 413, 524

[56] References Cited

U.S. PATENT DOCUMENTS 4,152,485 5/1979 Mizumura et al. ................. 428/425
5,278,275 1/1994 Yatsuka et al. ....................... 528/74

FOREIGN PATENT DOCUMENTS

58-41565 9/1983 Japan .
02000618 1/1990 Japan .

Primary Examiner—Stevan A. Resan
Attorney, Agent, or Firm—Leydig, Voit & Mayer, Ltd.

[57] ABSTRACT

According to the present invention, a magnetic recording medium having a non-magnetic support and a magnetic layer formed thereon is provided. The magnetic layer is formed from a composition containing as its main components ferromagnetic particles and a resinous binder. The binder resin contains a polyurethane resin containing as its components a high molecular weight polyol (A) with a molecular weight of 500 or more and an organic diisocyanate (B). The high molecular weight polyol (A) contains as its components an aromatic polyester diol (A-1) having a metal sulfonate group in an amount of 20 to 600 equivalents/$10^6$ g and a polyol (A-2) which has no metal sulfonate group and is in a liquid state at 20° C. The ratio between the aromatic polyester diol (A-1) and the polyol (A-2) is in the range of 10:1 to 1:4. A urethane group is contained in the polyurethane resin in an amount of 600 to 1500 equivalents/$10^6$ g.

14 Claims, 1 Drawing Sheet

FIG. 1

MAGNETIC RECORDING MEDIUM HAVING A MAGNETIC LAYER COMPRISING A SPECIFIED POLYURETHANE RESIN AND MAGNETIC PARTICLES

BACKGROUND OF THE INVENTION

1. Field of the Invention

The present invention relates to a magnetic recording medium such as a magnetic tape and a magnetic disk.

2. Description of the Related Art

A magnetic recording medium generally used such as a magnetic tape and a floppy disk is produced by applying a magnetic coating composition onto a substrate such as polyethylene terephthalate film in order to form a magnetic layer. The magnetic coating composition is usually prepared by dispersing needle-like magnetic particles having a major axis with a length of 1 μm or less in a resinous binder together with appropriate additives such as dispersing agents, lubricating agents, and antistatic agents.

The resinous binder contained in the magnetic layer is required to disperse magnetic particles excellently, to contain a great amount of magnetic particles, and to orientate magnetic particles contained in the binder. Also, the resinous binder is required to provide a magnetic layer with excellent durability, abrasion resistance, heat resistance, and adhesion to a non-magnetic support. Thus, the resinous binder plays a very important role.

Examples of conventional resinous binders contained in the magnetic layer include mixtures of polyurethane resins of an adipate type or a polycaprolactone type and nitrocellulose or polyvinyl chloride type copolymers. The improvement of the dispersibility of the magnetic particles is disclosed in Japanese Patent Publication No. 58-41565, describing that it is effective to use a polyurethane in which a metal sulfonate group is introduced.

In the magnetic recording medium, in order to improve the S/N ratio (signal/noise ratio) and realize a high recording density, the following measures are taken: More finely ground magnetic particles are packed in the magnetic layer and a high orientation is obtained; and a smooth surface of the magnetic layer is achieved.

However, in the case where the magnetic recording medium with a smooth surface is used as a magnetic tape, as the surface of the magnetic layer becomes smoother, the adhesion between the magnetic layer and the magnetic head is increased, resulting in an increase in the coefficient of friction. Namely, friction is increased. As a result, the running property of the magnetic tape and the running durability thereof are deteriorated. For this reason, resinous binders which have satisfactory durability and abrasion resistance have been required. In addition, resinous binders which have satisfactory heat resistance and adhesion with respect to non-magnetic supports have been required. Conventional resinous binders do not satisfy these conditions.

A polyurethane resin containing an aromatic polyester diol as a high molecular weight polyol is excellent in mechanical strength, abrasion resistance, heat resistance, etc. and overcomes some of the abovementioned problems; however, the other problems are not overcome yet. The polyurethane resin containing an aromatic polyester diol as a high molecular weight polyol has a higher glass transition temperature, compared with conventional polyurethane resins. Thus, a magnetic recording medium with a magnetic layer having the polyurethane resin containing an aromatic polyester diol is subjected to a calender treatment, the surface of the layer is not likely to be smooth. Furthermore, the adhesion between the magnetic layer and the non-magnetic support is not sufficient. The poor adhesion sometimes causes peeling of the magnetic layer from the non-magnetic support at the ends thereof, when a magnetic tape with the magnetic layer formed on the non-magnetic support is slit. When the magnetic layer is peeled off, the magnetic particles contained therein drop. The dropped magnetic particles adhere to a magnetic head, so that a dropout (i.e., lack of signals in the magnetic recording medium) arises.

In order to improve the S/N ratio and realize a high recording density in the magnetic recording medium, it is required that the magnetic particles with a high Hc (resistance to magnetic force) such as metal magnetic particles are packed in the magnetic layer, and that the magnetic particles should be oriented in a higher degree. In the case of the conventional resinous binders, it is difficult to disperse these magnetic particles therein. Insufficient dispersion of the particles increases porosity in the magnetic layer, as well as decreases electromagnetic conversion characteristics. The increase in the porosity deteriorates running durability of the obtained magnetic recording medium. The introduction of a metal sulfonate group into the polyurethane is remarkably effective for the improvement of dispersibility of the magnetic particles in the magnetic layer; however, the introduction of the metal sulfonate group sometimes increases the viscosity of a magnetic coating composition, resulting in the decrease in productivity of magnetic recording media to be obtained.

SUMMARY OF THE INVENTION

The magnetic recording medium of this invention includes a non-magnetic support and a magnetic layer formed thereon, the magnetic layer being formed from a composition containing as its main components ferromagnetic particles and a resinous binder, wherein the resinous binder contains a polyurethane resin containing as its components a high molecular weight polyol (A) with a molecular weight of 500 or more and an organic diisocyanate (B);

the high molecular weight polyol (A) contains an aromatic polyester diol (A-1) having a metal sulfonate group in an amount of 20 to 600 equivalents/$10^6$ g and a polyol (A-2) which has no metal sulfonate group and is in a liquid state at 20° C.;

a weight ratio between the aromatic polyol (A-1) and the liquid polyol (A-2) is in the range of 10:1 to 1:4; and a urethane group is contained in the polyurethane resin in an amount of 600 to 1500 equivalents/$10^6$ g.

In one embodiment, the polyurethane resin contains as its component a polyol compound (C) with a molecular weight of less than 500.

In another embodiment, the polyol (A-2) is at least one selected from the group consisting of aliphatic polyester polyols, alicyclic polyester polyols, polyether polyols, and polycarbonate polyols, each of which having a melting point of 20° C. or less in a crystalline state and being liquid at 20° C. in an amorphous state.

In another embodiment, the polyol (A-2) is at least one selected from the group consisting of aliphatic polyester polyols, alicyclic polyester polyols, polyether polyols, and polycarbonate polyols, which are amorphous.

In another embodiment, the weight ratio between the aromatic polyester diol (A-1) and the liquid polyol (A-2) is in the range of 10:1.5 to 1:3.

In another embodiment, a metal sulfonate group is contained in the aromatic polyester diol (A-1) in an amount of 60 to 400 equivalents/$10^6$ g.

In another embodiment, the temperature range in which a dynamic loss modulus of the polyurethane resin exceeds $10^9$ dyne/cm$^2$ is 40° C. or more, under the condition that a measurement is conducted at a frequency of 110 Hz and at a Temperature within the range of $-20°$ to 100° C.

In another embodiment, the urethane group is contained in the polyurethane resin in an amount of 700 to 1300 equivalents/$10^6$ g.

Thus, the invention described herein makes possible the advantages of, (1) providing a magnetic recording medium having a magnetic layer formed on a non-magnetic support, the magnetic layer containing excellently dispersed magnetic particles; (2) providing a magnetic recording medium having a magnetic layer formed on a non-magnetic support, in which the adhesion between the magnetic layer and the non-magnetic support is satisfactory, and a calender treatment is efficiently conducted; and (3) providing a magnetic recording medium which is excellent in running durability and abrasion resistance.

These and other advantages of the present invention will become apparent to those skilled in the art upon reading and understanding the following detailed description with reference to the accompanying figure.

DESCRIPTION OF THE PREFERRED EMBODIMENTS

Hereinafter, the present invention will be described in detail.

A resinous binder contained in a composition for forming a magnetic layer of a magnetic recording medium according to the present invention contains a polyurethane resin. The polyurethane resin contains as its components a high molecular weight polyol (A) with a molecular weight of 500 or more (hereinafter, referred to as a high molecular weight polyol (A)) and an organic diisocyanate (B).

According to the present invention, an aromatic polyester diol (A-1) having a metal sulfonate group and a polyol (A-2) which has no metal sulfonate group and is liquid at 20° C. are used as the abovementioned high molecular weight polyol (A).

Examples of carboxylic acid components of the above-mentioned aromatic polyester diol (A-1) include aromatic dicarboxylic acids such as terephthalic acid, isophthalic acid, orthophthalic acid, 1,5 -naphthalic acid, 2,6-naphthalic acid, 4,4'-diphenyldicarboxylic acid, 2,2'-diphenyldicarboxylic acid, and 4,4'-diphenyletherdicarboxylic acid. In particular, terephthalic acid, isophthalic acid, orthophthalic acid, and 2,6-naphthalic acid are preferred.

Examples of glycol components of the aromatic polyester diol (A-1) include ethylene glycol, propylene glycol, 1,3-propanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,3-pentanediol, cyclohexanedimethanol, ester of neopentyl glycol and hydroxypivalic acid, ethylene oxide adducts of bisphenol A, propylene oxide adducts of bisphenol A, ethylene oxide adducts of hydrogenated bisphenol A, propylene oxide adducts of hydrogenated bisphenol A, 1,9-nonanediol, 2-methyloctanediol, 1,10-dodecanediol, 2-butyl-2-ethyl-1,3-propanediol, and tricyclodecanedimethanol. Among these components, ethylene glycol, neopentyl glycol, cyclohexanedimethanol, ester of neopentylglycol and hydroxypivalic acid, 2-butyl-2-ethyl-1,3-propanediol, and tricyclodecanediol are preferred.

The aromatic polyester diol (A-1) has a metal sulfonate group. In order to introduce a metal sulfonate group into the aromatic polyester diol (A-1), dicarboxylic acids such as 5-sodium sulfoisophthalate, 5-potassium sulfoisophthalate, and sodium sulfoterephthalate; glycols such as 2-sodiumsulfo-1,4-butanediol, and 2,5-dimethyl-3-sodiumsulfo-2,5-hexanediol can be added in addition to the above-mentioned carboxylic acid components and the glycol components. Preferably, 5-sodium sulfoisophthalate and 5-potassium sulfoisophthalate can be added in addition to the above-mentioned carboxylic acid components and the glycol components.

The metal sulfonate group is contained in the aromatic polyester diol (A-1) in an amount of 20 to 600 equivalents/$10^6$ g. When the amount is less than 20 equivalents/$10^6$ g, the dispersibility of the magnetic particles in the resulting binder is insufficient; and when the amount is more than 600 equivalents/$10^6$ g, the viscosity of the resulting polyurethane resin solution and magnetic coating composition is increased, making it difficult to form a magnetic recording layer of the recording medium. A particularly preferred amount is 60 to 400 equivalents/$10^6$ g.

Examples of the polyol (A-2) which has no metal sulfonate group and is liquid at 20° C. include aliphatic polyester polyols, alicyclic polyester polyols, polyether polyols, polycarbonate polyols, etc. These compounds are crystalline or amorphous. In the case where these compounds are crystalline, the melting point thereof is 20° C. or less; and in the case where these compounds are amorphous, they are liquid at 20° C. Examples of the aliphatic or alicyclic polyester polyols which have a melting point of 20° C. or less or which are amorphous include polyester polyols obtained by the reaction of dicarboxylic acids such as adipic acid, azelaic acid, sebacic acid, β-methyladipic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid, and dimer acid; and glycols having a side chain or an ether bond such as propylene glycol, neopentyl glycol, 3-methyl-1,5-pentanediol, ester of neopentyl glycol and hydroxypivalic acid, 2-butyl-2-ethyl-1,3-propanediol, diethylene glycol, and triethylene glycol. Besides the dicarboxylic acids and the glycols, straight chain glycols such as ethylene glycol, 1,4-butanediol, and 1,6-hexanediol can be contained in The polyol (A-2) as long as the polyol (A-2) remains liquid at 20° C. Examples of the polyether polyol include amorphous polyether polyols such as polypropylene glycol, and poly(3-methyl-1,3-propylene glycol). Examples of the polycarbonate polyols include amorphous polycarbonate polyols such as poly (diethylene glycol carbonate).

The metal sulfonate group is capable of being adsorbed by the magnetic particles. When the aromatic polyester diol having the metal sulfonate group and high molecular weight polyol in a liquid state which has a small aggregation ability are reacted to obtain polyurethane, the interaction between the polyurethane adsorbed by the magnetic particles is decreased. As a result, the viscosity of the magnetic coating composition is decreased and the degree of packing of the magnetic particles in the magnetic layer is improved. The compatibility between the aromatic polyester diol and the polyol in a liquid state with a small aggregation ability is relatively poor. Thus, a peak width of dynamic loss modulus of the resulting polyurethane becomes large due to the liquid polyol. Because of this, even though the glass transition temperature of polyurethane is high, the adhesion of the magnetic coating composition to a base film becomes satisfactory and the calender treatment workability improves. These effects are remarkably exerted in the following case: When the dynamic loss modulus of the polyurethane resin used in the present invention is measured at 110 Hz and a temperature in the range of $-20°$ to $100°$ C., a temperature range in which the dynamic loss modulus exceeds $10^9$ dyne/cm$^2$ is $40°$ C. or more.

The aromatic polyester diol (A-1) and the polyol (A-2) are used in a weight ratio of 10:1 to 1:4, more preferably 10:1.5 to 1:3. When the weight ratio is outside of these ranges, the effects of the present invention described above are not likely to be exerted, narrowing the temperature range in which the dynamic loss modulus is high.

Examples of the organic diisocyanate (B) include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 1,5-naphthalene diisocyanate, 2,6-naphthalene diisocyanate, 3,3'-dimethyl-4,4'-diisocyanate, 4,4'-diisocyanatodiphenyl ether, 1,5-xylylene diisocyanate, 1,3-diisocyanatotrimethylcyclohexane, 1,4-diisocyanatomethylcyclohexane, 4,4'-diisocyanatocyclohexane, 4,4'-diisocyanatocyclohexylmethane, and isophorone diisocyanate.

According to the present invention, a polyol compound (C) (hereinafter, referred to as a low molecular weight polyol compound (C)) with a molecular weight of 500 or less is used, if required, for synthesis of the resinous binder. The low molecular weight polyol compound (C) has effects of regulating the amount of a urethane group in the polyurethane resin, thereby providing the polyurethane resin with specific toughness. In the case where the low molecular weight polyol compound (C) is a polyol with three or more functional groups, a cross-linking with high density can be achieved due to the reaction between the polyol and the isocyanate compound as a curing agent.

Examples of the low molecular weight polyol compound (C) include diol compounds such as ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, cyclohexanedimethanol, ester of hydroxypivalic acid and neopentyl glycol, ethylene oxide adducts of bisphenol A, propylene oxide adducts of bisphenol A, ethylene oxide adducts of hydrogenated bisphenol A, propylene oxide adducts of hydrogenated bisphenol A; polyol compounds having three or more functional groups such as trimethylol propane, glycerin, pentaerythritol, and dipentaerythritol. In particular, neopentyl glycol, ester of neopentyl glycol and hydroxypivalic acid, trimethylol propane, and glycerin are preferred.

The low molecular weight polyol compound (C) has effects of regulating the content of a urethane group in the polyurethane resin to be obtained and providing the polyurethane resin with specific toughness. The urethane group is contained in the polyurethane resin in an amount of 600 to 1500 equivalents/$10^6$ g, preferably 700 to 1300 equivalents/$10^6$ g. When the amount of the urethane group is less than 600 equivalents/$10^6$ g, the aggregation ability of the polyurethane resin to be obtained becomes too low, deteriorating the running durability of the magnetic recording medium to be obtained and making the heat resistance thereof insufficient. When the amount of the urethane group is more than 1500 equivalents/$10^6$ g, the degree of aggregation between segments in polyurethane which are not adsorbed by the magnetic particles is increased, making it difficult to disperse with high density the magnetic particles in the polyurethane resin. The viscosity of the magnetic coating composition obtained by using this resin is increased, deteriorating the calender treatment workability of the recording medium to be obtained.

The molecular weight of the polyurethane resin used in the present invention is in the range of 5000 to 80000, preferably in the range of 10000 to 50000. When the molecular weight is less than 5000, the mechanical strength of the polyurethane resin is insufficient, deteriorating the running durability of the magnetic recording medium to be obtained. When the molecular weight is more than 80000, the viscosity of the polyurethane resin is increased. As a result, the workability and the dispersibility of magnetic particles, abrasives, carbon black, etc. which are mixed with the resin become poor.

According to the present invention, in addition to the polyurethane resin as a resinous binder, for the purpose of improving the regulation of flexibility, cold resistance, heat resistance, etc., it is preferred that other resins and/or a curing agent are added. Examples of the other resins include vinyl chloride type resins, cellulose type resins, polyester resins, epoxy resins, phenoxy resins, polyvinylbutyral, acrylonitrile-butadiene copolymer, and polyurethane resins other than the above-mentioned polyurethane resins. Examples of the curing agent include polyisocyanate compounds, epoxy resins, melamine resins, urea resins, acid anhydrides, etc. Among them, polyisocyanate compounds are especially preferred.

Examples of the ferromagnetic particles contained in the magnetic layer of the magnetic recording medium of the present invention include particles of ferromagnetic oxides such as particles of $\gamma$-Fe$_2$O$_3$, particles of a mixed crystal of $\gamma$-Fe$_2$O$_3$ and Fe$_3$O$_4$, particles of $\gamma$-Fe$_2$O$_3$ or Fe$_3$O$_4$ coated with cobalt, particles of barium ferrite; and particles of ferromagnetic alloys such as Fe—Co and Fe—Co—Ni, etc.

If necessary, a plasticizer such as dibutyl phthalate and triphenylphosphate; a lubricating agent such as sodium dioctylsulfosuccinate, t-butylphenol polyethylene ether, sodium ethylnaphthalenesulfonate, dilauryl succinate, zinc stearate, soybean lecithin, and silicone oil; and/or various kinds of antistatic agents can be added to the magnetic layer of the magnetic recording medium of the present invention.

As the non-magnetic support used in the present invention, a film formed from polyethylene terephthalate, polyethylene naphthalate, polyimide, polyamide, etc. with a thickness of 6 to 15 μm can be used.

In the production of the magnetic recording medium of the present invention, for example, the high molecular weight polyol (A), the organic diisocyanate (B), and if necessary, the low molecular weight polyol compound (C) are reacted in a solvent by an ordinary method, thereby obtaining a polyurethane solution. Then, the polyurethane solution thus obtained or polyurethane (i.e., a resinous binder) obtained from the solution, and magnetic particles are thoroughly dispersed in a solvent by using a ball mill. Additives such as a curing agent, a lubricating agent, and the like are added, if necessary, to the dispersion to obtain a magnetic coating composition. The magnetic coating composition thus obtained was coated onto the non-magnetic support, followed by being dried. If necessary, the non-magnetic support coated with the magnetic coating composition is subjected to a calender treatment, thereby obtaining a magnetic recording medium.

Hereinafter, the present invention will be described by way of illustrating examples.

Preparation 1

First, 100 parts by weight of the polyester polyol (a) and 100 parts by weight of toluene were put into a reaction container equipped with a thermometer, an agitator, a reflux condenser, and a distilling tube. After the polyester polyol (a) was dissolved in the toluene, 20 parts by weight of toluene was distilled in order to remove water from the reaction system by azeotropy. The reaction system was cooled to 60° C., and then 26.5 parts by weight of 4,4'-diphenylmethane diisocyanate was added to the reaction system. The mixture thus obtained was heated at 80° C. for 2 hours. To this mixture, 80 parts by weight of methyl ethyl ketone, 40 parts by weight of polypropylene glycol with a molecular weight of 2000, 0.03 parts by weight of dibutyltin dilaurate as a reaction catalyst were added. The resulting mixture was allowed to react at 80° C. for 6 hours. Then, 2 parts by weight of neopentyl glycol was added to the mixture and heated at 80° C. for another 2 hours. Finally, 121.3 parts by weight of toluene, 121.3 parts by weight of methyl ethyl ketone, and 4 parts by weight of trimethylol propane were added to the mixture and allowed to react at 80° C. for 4 hours, thereby obtaining a polyurethane resin solution with a solid content of 30%. The viscosity of the polyurethane resin solution, components of the polyurethane resin thus obtained, and the physical properties of the resin are shown in Table 1. The concentration of polyurethane resin solutions obtained in Preparations 2 to 6 and Comparative Preparations 1 to 6, and the composition and physical characteristics thereof are also shown in Table 1.

Figure 1:
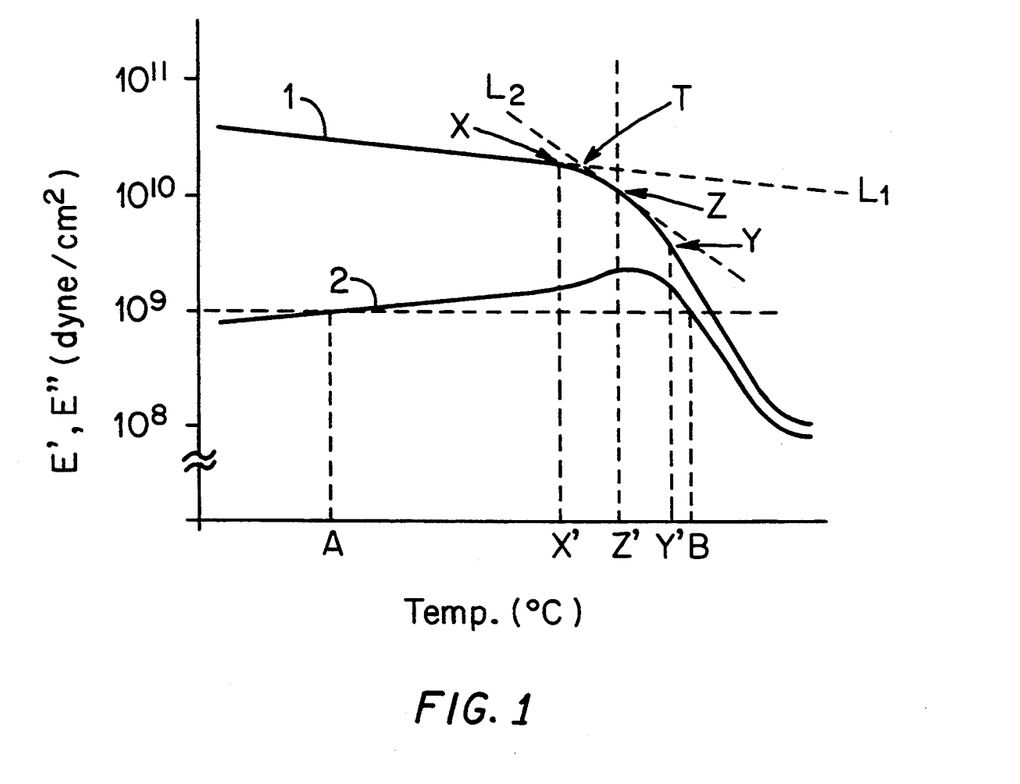
FIG. 1 is a graph showing the relationship between the temperature and the storage modulus E' of a polyurethane resin used in Examples and the loss modulus E'' thereof.

The viscosity of the polyurethane resin solution was measured at 25° C. The unit of the viscosity of the solution is poise. The number average molecular weight was measured using a tetrahydrofuran as a solvent by gel permeation chromatography. The dynamic viscoelasticity was obtained by measuring a storage modulus E' and a loss modulus E" at various temperatures. FIG. 1 shows a storage modulus characteristic curve 1 and a loss modulus characteristic curve 2 (the curve 1 is obtained by plotting the storage modulus E' measured at various temperatures and the curve 2 is obtained by plotting the loss modulus E" measured at various temperatures, respectively). The column E' of Table 1 shows a temperature at a curved point T determined from the characteristic curve 1 and the column E" shows a temperature range (from an initial temperature A to a final temperature B) in which the loss modulus E" exceeds $10^9$ dyne/cm$^2$. The curved point T is determined as follows: A temperature X' corresponding to a point X on the characteristic curve 1 where the storage modulus E' starts decreasing abruptly and a temperature Y' corresponding to a point Y on the characteristic curve 1 where a slope of the characteristic curve 1 reaches a maximum are plotted. Then, a middle temperature Z' between the temperatures X' and Y' is obtained. A point Z on the characteristic curve 1 corresponding to the temperature Z' is taken. Tangent lines are drawn at the points X and Z. A crossed point of these tangent lines $l_1$ and $l_2$ is taken as the curved point T.

Preparation 2

A polyurethane resin solution was prepared in the same way as in Preparation 1, except that polyester polyol (b) was added in an amount shown in Table 1 instead of the polypropylene glycol with a molecular weight of 2000, and trimethylol propane and 4,4'-diphenylmethane diisocyanate were added in an amount shown in Table 1 instead of the neopentyl glycol.

Preparation 3

A polyurethane resin solution was prepared in the same way as in Preparation 1, except that polyester polyol (c) was added in an amount shown in Table 1 instead of the polypropylene glycol with a molecular weight of 2000, and neopentyl glycol and 4,4'-diphenylmethane diisocyanate were added in an amount shown in Table 1 instead of the trimethylol propane.

Preparation 4

A polyurethane resin solution was prepared in the same way as in Preparation 1, except that polypropylene glycol with a molecular weight of 1000 was added in an amount shown in Table 1 instead of the polypropylene glycol with a molecular weight of 2000, and neopentyl glycol and 4,4'-diphenylmethane diisocyanate were added in an amount shown in Table 1 instead of the trimethylol propane.

Preparation 5

A polyurethane resin solution was prepared in the same way as in Preparation 1, except that polyester polyol (d) was added in an amount shown in Table 1 instead of the polyester polyol (a); polyester polyol (e) was added in an amount shown in Table 1 instead of the polypropylene glycol with a molecular weight of 2000; and neopentyl glycol, trimethylol propane, and 4,4'-diphenylmethane diisocyanate were added in an amount shown in Table 1.

Preparation 6

A polyurethane resin solution was prepared in the same way as in Preparation 1, except that polyester polyol (f) was used instead of the polyester polyol (a), and polypropylene glycol, trimethylol propane, and 4,4'-diphenylmethane diisocyanate were added in an amount shown in Table 1 instead of polypropylene glycol with a molecular weight of 2000.

Comparative Preparation 1

A polyurethane resin solution was prepared in the same way as in Preparation 1, except that polycaprolactone with a molecular weight of 2000 was used instead of the polypropylene glycol with a molecular weight of 2000.

The above-mentioned polycaprolactone is solid at 20° C.

Comparative Preparation 2

A polyurethane resin solution was prepared in the same way as in Preparation 2, except that polyester polyol (g) was used instead of the polyester polyol (b).

The above-mentioned polyester polyol (g) is solid at 20° C.

Comparative Preparation 3

A polyurethane resin solution was prepared in the same way as in Preparation 1, except that the polyester polyol (b) was added in an amount shown in Table 1 instead of the polypropylene glycol with a molecular weight of 2000, and neopentyl glycol, trimethylol propane, and 4,4'-diphenylmethane diisocyanate were added in an amount shown in Table 1.

Comparative Preparation 5

A polyurethane resin solution was prepared in the same way as in Preparation 1, except that the polyester polyol (d) was used instead of the polyester polyol (a), the polyester polyol (e) was added in an amount shown in Table 1 instead of the polypropylene glycol with a molecular weight of 2000; and neopentyl glycol, trimethylol propane, and 4,4'-diphenylmethane diisocyanate were added in an amount shown in Table 1.

In Comparative Preparation 5, the ratio between the aromatic polyester diol and the liquid polyol was not in the range of 10:1 to 1:4.

Comparative Preparation 6

A polyurethane resin solution was prepared in the same way as in Preparation 1, except that the polyester polyol (f) was used instead of the polyester polyol (a), polypropylene glycol with a molecular weight of 2000, trimethylol propane, and 4,4'-diphenylmethane diisocyanate were added in an amount shown in Table 1 instead of the neopentyl glycol.

In Comparative Preparation 6, the ratio between The aromatic polyester diol and the liquid polyol was not in The range of 10:1 to 1:4.

TABLE 1

| | Composition of Polyurethane (weight ratio) | | | | Viscosity of Solution 25° C. (poise) | Number Average Molecular Weight | Dynamic Viscoelasticity | |
|---|---|---|---|---|---|---|---|---|
| | Aromatic Polyester | | Aromatic Diisocyanate (B) | Low Molecular Weight Polyol Compound (C) | | | | |
| | Diol (A-1) | Liquid Polyol (A-2) | | | | | E' (°C.) | E" (°C.) |
| Preparation 1 | Polyester Polyol (a) 100 | PPG-2000 40 | MDI 26.5 | NPG 2 TMP 4 | 13 | 28000 | 45 | 0–80 |
| Preparation 2 | Polyester Polyol (a) 100 | Polyester Polyol (b) 50 | MDI 19.3 | TMP 3 | 24 | 35000 | 27 | 10–70 |
| Preparation 3 | Polyester Polyol (a) 100 | Polyester Polyol (c) 30 | MDI 26 | NPG 3 | 12 | 42000 | 41 | 10–65 |
| Preparation 4 | Polyester Polyol (a) 100 | PPG-1000 100 | MDI 41.5 | NPG 3 | 31 | 47000 | −11 | −30–35 |
| Preparation 5 | Polyester Polyol (d) 50 | Polyester Polyol (e) 150 | MDI 31.2 | NPG 3 TMP 5 | 95 | 31000 | −28 | −30–45 |
| Preparation 6 | Polyester Polyol (f) 100 | PPG-2000 20 | MDI 19.5 | TMP 3 | 5 | 21000 | 60 | 45–90 |
| Comparative Preparation 1 | Polyester Polyol (a) 100 | PCL-2000 40 | MDI 26.5 | NPG 2 TMP 4 | 78 | 30000 | 34 | 25–55 |
| Comparative Preparation 2 | Polyester Polyol (a) 100 | Polyester Polyol (g) 50 | MDI 19.3 | TMP 3 | 53 | 34000 | 23 | 5–40 |
| Comparative Preparation 3 | Polyester Polyol (a) 100 | Polyester Polyol (b) 50 | MDI 42 | NPG 10 TMP 3 | 220 | 32000 | 36 | 25–55 |
| Comparative Preparation 4 | Polyester Polyol (h) 100 | PPG-2000 40 | MDI 26.5 | NPG 2 TMP 4 | 5 | 29000 | 41 | 15–80 |
| Comparative Preparation 5 | Polyester Polyol (d) 100 | Polyester Polyol (e) 500 | MDI 122 | NPG 9 TMP 15 | 15 | 30000 | −38 | −65–−5 |
| Comparative Preparation 6 | Polyester Polyol (f) 100 | PPG-2000 5 | MDI 14.8 | TMP 2.5 | 5 | 23000 | 71 | 65–95 |

A urethane group was contained in an amount of 1640 equivalents/$10^6$ g in the polyurethane resin thus obtained.

Comparative Preparation 4

A polyurethane resin solution was prepared in the same way as in Preparation 1, except that polyester polyol (h) was used instead of the polyester polyol (a).

A metal sulfonate group was contained in an amount of 14 equivalents/$10^6$ g in the polyester polyol (h) used as an aromatic polyester diol.

The composition of raw materials and number average molecular weight of compounds represented by the abbreviations in Table 1 are as follows:

Polyester polyol (a): T:I:DSN:EG:NPG=50:47:3:50:50 (Molar ratio), MW-2500
PPG-2000: Polypropylene glycol, MW=2000
PPG-1000: Polypropylene glycol, MW=1000
Polyester polyol (b): Poly(3-methyl-1,5-pentane adipate), MW=4000
Polyester polyol (c): Dimer acid/ethylene glycol, MW=800

Polyester polyol (d): T:I:DSN:EG:NPG=50:40:10:50:50 (Molar ratio), MW=2000

Polyester polyol (e): Poly(3-methyl-1,5-pentane adipate), MW=2000

Polyester polyol (f): T:I:DSN:TCD:CHDM:EG=50:49.2: 0.8:30:40:30 (Molar ratio), MW=2200

PCL-2000: Polycaprolactone, MW=2000

Polyester polyol (g): Polybutylene adipate, MW=4000

Polyester polyol (h): T:I:DNS:EG:NPG=50:49.7:0.3:50:50 (Molar ratio), MW=2500

NPG: Neopentyl glycol
TMP: Trimethylol propane
MDI: 4,4'-diphenylmethane diisocyanate The abbreviations used in the above-described compositions of the polyester polyols (a), (d), (f) or (h) represent the following compounds.

T: Terephthalic acid
I: Isophthalic acid
DSN: Dimethyl 5-sodium sulfoisophthalate
EG: Ethylene glycol
TCD: Tricyclodecanedimethylol
CHDM: Cyclohexane dimethanol

EXAMPLE 1

A composition containing the following ingredients were charged into a ball mill and dispersed for 48 hours. Then, one part by weight of a polyisocyanate compound, Coronate MR (manufactured by Japan Polyurethane Industry Co., Ltd.) as a curing agent; and 0.05 parts by weight of stearic acid and 0.05 parts by weight of butyl stearate as a lubricating agent were added To the mixture. The mixture was dispersed for another one hour to obtain a magnetic coating composition. The magnetic coating composition was coated onto a polyethylene terephthalate film with a thickness of 15 μm so that the thickness of the film after being dried became 4 μm. The film was dried by applying a magnetic field of 2,000 Gauss. The film thus obtained was passed through a calender roll at a linear pressure of 200 kg/cm and at 80° C. for the purpose of smoothing the surface of a magnetic layer, whereby a magnetic tape was obtained. The magnetic tape thus obtained was allowed to stand at 60° C. for one day, after which the ape was slit into a ½ inch width. The surface glossiness of the magnetic layer before being subjected to the calender treatment and the squareness ratio of the magnetic tape obtained were measured by the following methods. The surface roughness of the magnetic layer before and after the calender treatment were also measured. In addition, the adhesion between the magnetic layer and the non-magnetic support, the degree of packing of the magnetic layer, and the viscosity of the magnetic coating composition were measured. Moreover, the magnetic tape was run in a commercially available VTR deck, and scratches in the magnetic layer after being run 100 times at 10° C. and 40° C., respectively were observed. The results of the present example are shown in Table 2 together with those of Examples 2 to 8.

| Ingredients | Amount (Parts by weight) |
| --- | --- |
| A polyurethane resin solution obtained in Preparation 1 [Solid content: 30%; in a mixed solvent of MEK and toluene(1:1)] | 10 |
| Magnetic particles (ferrite particles coated with cobalt; BET: 45 m²/g) | 12 |
| Cyclohexanone | 5 |
| Toluene | 5 |
| MEK | 5 |
| Alumina (average particle size: 0.05 μm) | 0.5 |

Evaluation was conducted as follows:

(1) Glossiness of magnetic layer: measured as reflectance at 60° by using Gloss Checker IG 320 (manufactured by Horiba Ltd.).

(2) Squareness ratio: measured by using Vibrating Sample Magnetometer BHV-50 (manufactured by Riken Denshi Co., Ltd.).

(3) Surface roughness: measured by using Surface Texture & Contour Measuring Instrument (SURFCOM 304B) (manufactured by Tokyo Precision Instruments Co., Ltd.).

(4) Adhesion test of magnetic layer: An adhesive tape (manufactured by Nichiban Co., Ltd.) was attached to the magnetic layer. Then, the 180° peeling test was conducted at a speed of 100 mm/min substantially in accordance with JIS K 6854. The temperature employed for this test was 20° C.

(5) Packing degree of magnetic particles in magnetic layer: The magnetic tape previously weighed was soaked in silicone oil, and subjected to an ultrasonic treatment for 10 minutes. The silicone oil adhered to the surface of the magnetic tape was removed, after which the magnetic tape was weighed. The silicone oil penetrates into an opening in the magnetic layer. Therefore, as the weight increase due to the penetration of the silicone oil is higher, the packing degree of the magnetic particles in the magnetic layer is lower.

(6) Viscosity of magnetic coating composition: The viscosity was measured at 12 rpm and 25° C. by using B-type viscometer (manufactured by Tokimec Inc.).

EXAMPLES 2 to 8

A magnetic tape was obtained in the same way as in Example 1, except that a polyurethane resin shown in Table 2 was used instead of the polyurethane resin of Preparation 1. The same tests as those in Example 1 were conducted by using this magnetic tape.

Comparative Examples 1 to 8

A magnetic tape was obtained in the same way as in Example 1, except that a polyurethane resin shown in Table 3 was used instead of the polyurethane resin of Preparation 1. The same tests as those in Example 1 were conducted by using this magnetic tape.

TABLE 2

| | Example 1 Polyurethane Resin of | Example 2 Polyurethane Resin of | Example 3 Polyurethane Resin of | Example 4 Polyurethane Resin of | Example 5 Mixture of Polyurethane Resin of Preparation 4 and PVC-1[b] | Example 6 Mixture of Polyurethane Resin of Preparation 5 and PVC-1[b] |
| --- | --- | --- | --- | --- | --- | --- |

TABLE 2-continued

| Binder[a] | | Preparation 1 | Preparation 2 | Preparation 3 | Preparation 4 | (weight ratio = 1:1) | (weight ratio = 1:1) |
|---|---|---|---|---|---|---|---|
| Glossiness of Magnetic Layer | | 115 | 110 | 108 | 115 | 113 | 122 |
| Squareness Ratio | | 0.85 | 0.84 | 0.84 | 0.85 | 0.84 | 0.86 |
| Surface Roughness | Before Calender Treatment | 0.012 μm | 0.014 μm | 0.015 μm | 0.011 μm | 0.015 μm | 0.013 μm |
| | After Calender Treatment | 0.007 μm | 0.007 μm | 0.008 μm | 0.005 μm | 0.009 μm | 0.008 μm |
| Adhesion of Magnetic Layer | | 120 g/cm | 125 g/cm | 110 g/cm | 130 g/cm | 100 g/cm | 125 g/cm |
| Packing Degree | | 10% | 11% | 12% | 10% | 13% | 13% |
| Abrasion State of Magnetic Layer After Being Run[c] | 10° C. | ○ | ○ | ○ | ○ | ○ | ○ |
| | 40° C. | ○ | ○ | ○ | ○-Δ | ○ | ○ |
| Viscosity of Magnetic Coating Composition | | 4.6 poise | 5.2 poise | 7.3 poise | 6.5 poise | 8.6 poise | 8.2 poise |

| Binder[a] | | Example 7 Polyurethane Resin of Preparation 6 | Example 8 Mixture of Polyurethane Resins of Preparations 6 and 4 (weight ratio = 1:1) |
|---|---|---|---|
| Glossiness of Magnetic Layer | | 120 | 130 |
| Squareness Ratio | | 0.85 | 0.87 |
| Surface Roughness | Before Calender Treatment | 0.012 μm | 0.010 μm |
| | After Calender Treatment | 0.009 μm | 0.007 μm |
| Adhesion of Magnetic Layer | | 65 g/cm | 130 g/cm |
| Packing Degree | | 11% | 9% |
| Abrasion State of Magnetic Layer After Being Run[c] | 10° C. | ○ | ○ |
| | 40° C. | ○ | ○ |
| Viscosity of Magnetic Coating Composition | | 4.5 poise | 6.7 poise |

[a]Weight ratio between resin and magnetic particles is 1:4.
[b]PVC-1 is vinyl chloride type copolymer (MR-100, Manufactured by Nippon Zeon Co., Ltd.).
[c]Abrasion State of Magnetic Layer
○: No scratches are found in a magnetic layer.
Δ: A few scratches are found in a magnetic layer.
x: A great number of scratches are found in a magnetic layer.

TABLE 3

| Binder[a] | | Comparative Example 1 Polyurethane Resin of Comparative Preparation 1 | Comparative Example 2 Polyurethane Resin of Comparative Preparation 2 | Comparative Example 3 Polyurethane Resin of Comparative Preparation 3 | Comparative Example 4 Polyurethane Resin of Comparative Preparation 4 | Comparative Example 5 Polyurethane Resin of Comparative Preparation 5 | Comparative Example 6 Mixture of Polyurethane Resin of Comparative Preparation 5 and PVC-1[b] (weight ratio = 1:1) |
|---|---|---|---|---|---|---|---|
| Glossiness of Magnetic Layer | | 115 | 112 | 102 | 55 | 110 | 103 |
| Squareness Ratio | | 0.85 | 0.82 | 0.80 | 0.73 | 0.83 | 0.82 |
| Surface Roughness | Before Calender Treatment | 0.012 μm | 0.015 μm | 0.021 μm | 0.031 μm | 0.017 μm | 0.021 μm |
| | After Calender Treatment | 0.010 μm | 0.011 μm | 0.014 μm | 0.022 μm | 0.011 μm | 0.015 μm |
| Adhesion of Magnetic Layer | | 35 g/cm | 45 g/cm | 75 g/cm | 130 g/cm | 135 g/cm | 45 g/cm |
| Packing Degree | | 19% | 18% | 21% | 22% | 19% | 23% |
| Abrasion State of Magnetic Layer After Being Run[c] | 10° C. | ○ | ○ | ○ | x | Δ | ○ |
| | 40° C. | ○ | ○ | ○ | x | x | x |
| Viscosity of Magnetic Coating Composition | | 8.7 poise | 8.6 poise | 9.4 poise | 35.1 poise | 10.8 poise | 18.7 poise |

| Binder[a] | Comparative Example 7 Polyurethane Resin of Comparative Preparation 6 | Comparative Example 8 Mixture of Polyurethane Resins of Comparative Preparations 5 and 6 (weight ratio = 1:1) |
|---|---|---|
| Glossiness of Magnetic Layer | 121 | 120 |

TABLE 3-continued

|  |  |  |  |
|---|---|---|---|
| Squareness Ratio |  | 0.85 | 0.84 |
| Surface Roughness | Before Calender Treatment | 0.012 μm | 0.012 μm |
|  | After Calender Treatment | 0.011 μm | 0.010 μm |
| Adhesion of Magnetic Layer |  | 5 g/cm | 55 g/cm |
| Packing Degree |  | 22% | 19% |
| Abrasion State of Magnetic Layer After Being Run[c] | 10° C. | Δ | ◯ |
|  | 40° C. | ◯-Δ | Δ |
| Viscosity of Magnetic Coating Composition |  | 7.3 poise | 12.5 poise |

[a] Weight ratio between resin and magnetic particles is 1:4.
[b] PVC-1 is vinyl chloride type copolymer (MR-100, Manufactured by Nippon Zeon Co., Ltd.).
[c] Abrasion State of Magnetic Layer
◯: No scratches are found in a magnetic layer.
Δ: A few scratches are found in a magnetic layer.
x: A great number of scratches are found in a magnetic layer.

As described above, the magnetic recording medium of the present invention contains magnetic particles and a polyurethane resin as a binder. The polyurethane resin is made from the high molecular weight polyol (A) containing the aromatic polyester diol (A-1) having a metal sulfonate group and the polyol (A-2) which has no metal sulfonate group and is in a liquid state at 20° C.

Therefore, the dispersibility of the magnetic particles in the resin is excellent and the viscosity of the magnetic coating composition containing the resinous binder is decreased, resulting in satisfactory productivity. Moreover, the adhesion between the magnetic layer and the non-magnetic support is satisfactory, and the calender treatment can be conducted with sufficient effects. As a result, a magnetic recording medium excellent in running durability and abrasion resistance can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording medium comprising a non-magnetic support and a magnetic layer formed thereon, the magnetic layer being formed from a composition containing as its main components ferromagnetic particles and a resinous binder,
   wherein the resinous binder contains a polyurethane resin and a curing agent, the polyurethane resin containing as its components a high molecular weight polyol (A) with a molecular weight of 500 or more and an organic diisocyanate (B);
   the high molecular weight polyol (A) contains an aromatic polyester diol (A-1) having a metal sulfonate group in an amount of 20 to 600 equivalents/$10^6$ g and a polyol (A-2) which has no metal sulfonate group and is in a liquid state at 20° C.;
   a weight ratio between the aromatic polyol (A-1) and the liquid polyol (A-2) is in the range of 10:1 to 1:4;
   an urethane group is contained in the polyurethane resin in an amount of 600 to 1500 equivalents/$10^6$ g, and
   the temperature range in which a dynamic loss modulus of the polyurethane resin exceeds $10^9$ dyne/cm$^2$ is 40° C. or more, under the condition that a measurement is conducted at a frequency of 110 Hz and at a temperature within the range of −20° to 100° C.

2. A magnetic recording medium according to claim 1, wherein the polyol (A-2) is at least one selected from the group consisting of aliphatic polyester polyols, alicyclic polyester polyols, polyether polyols, and polycarbonate polyols, each of which having a melting point of 20° C. or less in a crystalline state and being liquid at 20° C. in an amorphous state.

3. A magnetic recording medium according to claim 1, wherein the polyol (A-2) is at least one selected from the group consisting of aliphatic polyester polyols, alicyclic polyester polyols, polyether polyols, and polycarbonate polyols, which are amorphous.

4. A magnetic recording medium according to claim 1, wherein the weight ratio between the aromatic polyester diol (A-1) and the liquid polyol (A-2) is in the range of 10:1.5 to 1:3.

5. A magnetic recording medium according to claim 1, wherein a metal sulfonate group is contained in the aromatic polyester diol (A-1) in an amount of 60 to 400 equivalents/$10^6$ g.

6. A magnetic recording medium according to claim 1, wherein the urethane group is contained in the polyurethane resin in an amount of 700 to 1300 equivalents/$10^6$ g.

7. A magnetic recording medium according to claim 1, wherein the polyurethane resin contains as its component a polyol compound (C) with a molecular weight of less than 500.

8. A magnetic recording medium according to claim 7, wherein the polyol (A-2) is at least one selected from the group consisting of aliphatic polyester polyols, alicyclic polyester polyols, polyether polyols, and polycarbonate polyols, each of which having a melting point of 20° C. or less in a crystalline state and being liquid at 20° C. in an amorphous state.

9. A magnetic recording medium according to claim 7, wherein the polyol (A-2) is at least one selected from the group consisting of aliphatic polyester polyols, alicyclic polyester polyols, polyether polyols, and polycarbonate polyols, which are amorphous.

10. A magnetic recording medium according to claim 7, wherein the weight ratio between the aromatic polyester diol (A-1) and the liquid polyol (A-2) is in the range of 10:1.5 to 1:3.

11. A magnetic recording medium according to claim 7, wherein a metal sulfonate group is contained in aromatic polyester diol (A-1) in an amount of 60 to 400 equivalents/$10^6$ g.

12. A magnetic recording medium according to claim 7, wherein the temperature range in which a dynamic loss modulus of the polyurethane resin exceeds $10^9$ dyne/cm² is 40° C. or more, under the condition that a measurement is conducted at a frequency of 110 Hz and at a temperature within the range of −20° to 100° C.

13. A magnetic recording medium according to claim 7, wherein the urethane group is contained in the polyurethane resin in an amount of 700 to 1300 equivalents/$10^6$ g.

14. A magnetic recording medium according to claim 1, wherein the curing agent is at least one selected from the group consisting of polyioscyanate compounds, epoxy resins, melamine resins, urea resins, and acid anhydrides.

* * * * *